US011378681B2

(12) United States Patent
Wu et al.

(10) Patent No.: US 11,378,681 B2
(45) Date of Patent: Jul. 5, 2022

(54) SYSTEMS AND METHODS FOR AUTOMOTIVE SYNTHETIC APERTURE RADAR

(71) Applicant: NXP USA, Inc., Austin, TX (US)

(72) Inventors: Ryan Haoyun Wu, San Jose, CA (US); Maik Brett, Taufkirchen (DE); Michael Andreas Staudenmaier, Munich (DE)

(73) Assignee: NXP USA, Inc., Austin, TX (US)

( * ) Notice: Subject to any disclaimer, the term of this patent is extended or adjusted under 35 U.S.C. 154(b) by 159 days.

(21) Appl. No.: 16/668,772

(22) Filed: Oct. 30, 2019

(65) Prior Publication Data

US 2021/0132215 A1 May 6, 2021

(51) Int. Cl.
*G01S 13/90* (2006.01)
*G01S 7/02* (2006.01)
*G01S 7/497* (2006.01)

(52) U.S. Cl.
CPC .......... *G01S 13/9023* (2013.01); *G01S 7/024* (2013.01); *G01S 7/497* (2013.01)

(58) Field of Classification Search
CPC ....... G01S 13/9023; G01S 7/024; G01S 7/497
USPC ......................................................... 342/156
See application file for complete search history.

(56) References Cited

U.S. PATENT DOCUMENTS

| | | | | |
|---|---|---|---|---|
| 4,630,228 A * | 12/1986 | Tarczy-Hornoch | .......................... G01R 23/163 | 379/22.03 |
| 4,910,520 A * | 3/1990 | Rosen | ................. G01S 13/9004 | 342/25 A |
| 5,339,080 A * | 8/1994 | Steinway | ............ G01S 13/0209 | 342/25 R |
| 5,430,445 A * | 7/1995 | Peregrim | ................. G01S 13/22 | 342/25 C |
| 5,448,241 A * | 9/1995 | Zeoli | ....................... G01S 13/90 | 342/194 |
| 5,608,404 A * | 3/1997 | Burns | .................. G01S 13/9027 | 342/25 A |
| 5,708,436 A * | 1/1998 | Loiz | ........................ G01S 13/86 | 342/162 |

(Continued)

FOREIGN PATENT DOCUMENTS

| | | | | |
|---|---|---|---|---|
| CN | 104297751 B | * | 3/2017 | ......... G01S 13/9017 |
| EP | 2045877 A1 | * | 4/2009 | ........... G01S 13/524 |

*Primary Examiner* — Bernarr E Gregory
*Assistant Examiner* — Nuzhat Pervin

(57) ABSTRACT

Embodiments are disclosed that for synthetic aperture radar (SAR) systems and methods. Front-end circuitry transmits radar signals, receives return radar signals, and outputs digital radar data. FFT circuits process the digital radar data without zero-padding to generate FFT data corresponding to oversampled pixel range values. A processor further processes the FFT data to generate radar pixel data representing a radar image. Further, the FFT circuits can interpolate the FFT data based upon pixel ranges using a streamlined range computation process. This process pre-computes x-axis components for pixels in common rows and y-axis components for pixels in common columns within the FFT data. For one embodiment, a navigation processor is coupled to a SAR system within a vehicle, receives the radar pixel data, and causes one or more actions to occur based upon the radar pixel data, such as an advanced driver assistance system function or an autonomous driving function.

14 Claims, 4 Drawing Sheets

(56) References Cited

U.S. PATENT DOCUMENTS

| | | | | |
|---|---|---|---|---|
| 5,805,098 | A * | 9/1998 | McCorkle | G01S 13/9017 342/197 |
| 5,923,278 | A * | 7/1999 | Poehler | G01S 13/9019 342/25 C |
| 5,969,662 | A * | 10/1999 | Hellsten | G01S 7/003 342/25 A |
| 6,492,932 | B1 * | 12/2002 | Jin | G01S 13/904 342/25 R |
| 6,781,541 | B1 * | 8/2004 | Cho | G01S 13/904 342/25 R |
| 7,307,580 | B2 * | 12/2007 | Sherman | G01S 7/003 342/25 D |
| 7,714,768 | B2 * | 5/2010 | Sherman | G01S 7/003 342/25 D |
| 7,940,376 | B2 * | 5/2011 | Harnisch | G01S 13/9005 356/5.1 |
| 8,144,052 | B2 * | 3/2012 | Cooper | H01Q 19/191 342/179 |
| 8,207,887 | B2 * | 6/2012 | Goldman | G01S 13/9029 342/159 |
| 8,344,934 | B2 * | 1/2013 | Ryland | G01S 13/9017 342/25 A |
| 8,466,834 | B2 * | 6/2013 | Fortuny-Guasch | G01S 13/9023 342/25 R |
| 9,261,593 | B1 * | 2/2016 | Mountcastle | G01S 13/9088 |
| 9,729,160 | B1 * | 8/2017 | Marvasti | H03M 1/1265 |
| 10,317,518 | B2 * | 6/2019 | Warnick | H01Q 21/064 |
| 10,436,890 | B2 * | 10/2019 | Loesch | G01S 13/34 |
| 10,459,061 | B2 * | 10/2019 | Thomas, Jr. | G01S 13/9029 |
| 10,585,171 | B2 * | 3/2020 | Oswald | G01S 13/951 |
| 2003/0071750 | A1 * | 4/2003 | Benitz | G01S 13/9011 342/25 R |
| 2007/0164894 | A1 * | 7/2007 | Sherman | G01S 13/9011 342/25 F |
| 2008/0042893 | A1 * | 2/2008 | Connell | G01S 13/9019 342/25 F |
| 2008/0100510 | A1 * | 5/2008 | Bonthron | G01S 13/89 342/373 |
| 2010/0066598 | A1 * | 3/2010 | Sherman | G01S 13/9011 342/25 F |
| 2010/0321234 | A1 * | 12/2010 | Goldman | G01S 13/9029 342/25 A |
| 2011/0006944 | A1 * | 1/2011 | Goldman | G01S 13/9054 342/25 A |
| 2011/0140954 | A1 * | 6/2011 | Fortuny-Guasch | G01S 13/9023 342/179 |
| 2014/0009326 | A1 * | 1/2014 | Wishart | G01S 13/90 342/25 D |
| 2017/0074640 | A1 * | 3/2017 | Cable | G01B 9/02007 |
| 2018/0100920 | A1 * | 4/2018 | Thomas, Jr. | G01S 3/14 |
| 2019/0258251 | A1 * | 8/2019 | Ditty | G06V 20/58 |

* cited by examiner

SYSTEMS AND METHODS FOR AUTOMOTIVE SYNTHETIC APERTURE RADAR

TECHNICAL FIELD

This technical field relates to radar systems and synthetic aperture radar (SAR) systems.

BACKGROUND

Conventional automotive radar is constrained by the small physical size of antenna apertures due to available space and cost in many automotive solutions. A small aperture limits the angular resolution performance of the radar resulting in coarse pixel quality of images formed for targets detected using the radar. For some solutions such as autonomous driving applications, high precision radar imaging resolution is needed. For such applications, synthetic aperture radar (SAR) techniques have been used in prior solutions to obtain higher precision images. In SAR techniques, a successive number of data frames are collected from a moving radar, and these data frames are combined coherently to provide improved resolution. The SAR technique effectively provides an increased virtual aperture that is spanned by the radar in the moving vehicle.

Prior solutions have used back projection (BP) SAR processing to generate SAR images. Current BP SAR implementations require at least one set of transmit and receive antennas (assuming separate transmit and receive antennas are used) and a moving platform (e.g., a car) on which the SAR system is situated. A GPS (Global Positioning System) receiver and Inertial Measuring Unit (GPS-IMU) sensor is usually needed to estimate the exact position and velocity of the radar antenna when each radar chirp is being transmitted by the SAR system. The precise position information of the phase center of the radar antenna is then used to compute the range to a virtual point in the environment that is to be imaged. Usually a rectangular grid is virtually created to cover a rectangular area to be imaged, and each grid point is a pixel of a radar image to be formed. At the start of each transmitted chirp, the round-trip delay (RTD) representing the traveling time the chirp signal takes to travel (e.g., from the transmit antenna to a pixel and back to the receive antenna) is calculated, and a matched filter tuned to that RTD is applied to the received return radar signal. If a reflective target object is present in the pixel location, the matched filter outputs a strong signal with phase removed. If a target is absent at the pixel, the matched filter only outputs receiver noise. Because the matched-filter output has phase close to zero while noise signal has random phase, the target signal is added coherently over multiple chirps while the noise is added non-coherently. By accumulating the matched filter outputs over more and more transmit chirps for every pixel, an image of the entire radar scene can be formed with greater and greater clarity.

For automotive SAR systems, a linear chirp modulation (FCM) waveform is commonly used for transmit chirps, and the matched filter can be partially carried out in the analog domain using a chirp de-ramping mixer. The chirp de-ramping mixer functions to mix the transmitted chirp signal with the received echo return signal. The output of the analog mixer is then converted to digital samples in analog-digital converter (ADC) circuitry. In the digital domain following the de-ramping mixer and the ADC circuitry, a Discrete Fourier Transform (DFT) filter tuned to a particular range corresponding to each pixel is performed on the sampled data. Phase compensation is then applied to obtain the final matched filter output for that pixel, and its value is added to a corresponding element of an array representing the amplitude values of a pixel map of the image to be formed. The digital domain process repeats itself for all pixels and multiple chirps until a final radar image is constructed.

Conventional BP SAR systems, therefore, rely on matched filtering the received target echo data to a hypothesized range to each pixel under test. For radar solutions using linear frequency modulation (LFM) or linear chirp modulation (LCM) in frequency modulation continuous wave (FMCW) radars, the DFT computation is performed on the chirp data with respect to each pixel under test based on the range to the pixel. This matched-filtering processing sometimes includes range rate and direction as well. Because of the high cost of DFT computations, the DFT computations are usually substituted with lower cost techniques with interpolation conducted about some fixed-grid range data. These reduced precision techniques are usually achieved using oversampled Fast Fourier Transform (FFT) computations and nearest-cell interpolations, which in part leverages the algorithmic efficiency of FFT computations.

To achieve good performance, however, the oversampled FFT and nearest-cell interpolation approach requires that the output FFT vector to have a sufficiently fine grid resolution so that quantization error can be tolerated. This sufficiently fine grid resolution is commonly achieved by first zero-padding the original samples to over four (4) times to eight (8) times the original data length, and then applying the FFT on the zero-padded data. This zero-padding approach, therefore, requires the FFT to process data vectors that are multiple-times longer than the original data, and the computation burden is increased from $O\{N \log N\}$ to $O\{K \log K\}$ with an up-sampling factor of K/N where K is greater than N. If ASICs are used, this zero-padding approach also requires that the hardware FFT accelerators in the ASICs support data inputs with extended lengths, increasing the cost of such accelerators and making related solutions cost prohibitive for many applications. As one example for a mid-range radar with a 0.1 meter range resolution seeing up to 100 meters in range, the range spectrum is produced by FFT computations on 2000 fast-time real-channel samples that are zero-padded to 2048. In this case, the maximum FFT length will be 2048 samples. To use the same samples for SAR imaging in prior solutions, however, a times-8 (×8) over-sampling is required such that a 16 kilo-sample long FFT is needed. Because such long FFTs are usually not supported by hardware accelerators, lower oversampling factors must be used resulting in higher quantization error. As such, prior FFT solutions are impractical for many applications, such as automotive radar applications, due to computational complexity and device sizes required in these prior FFT-based solutions.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

DETAILED DESCRIPTION

Figure 1:
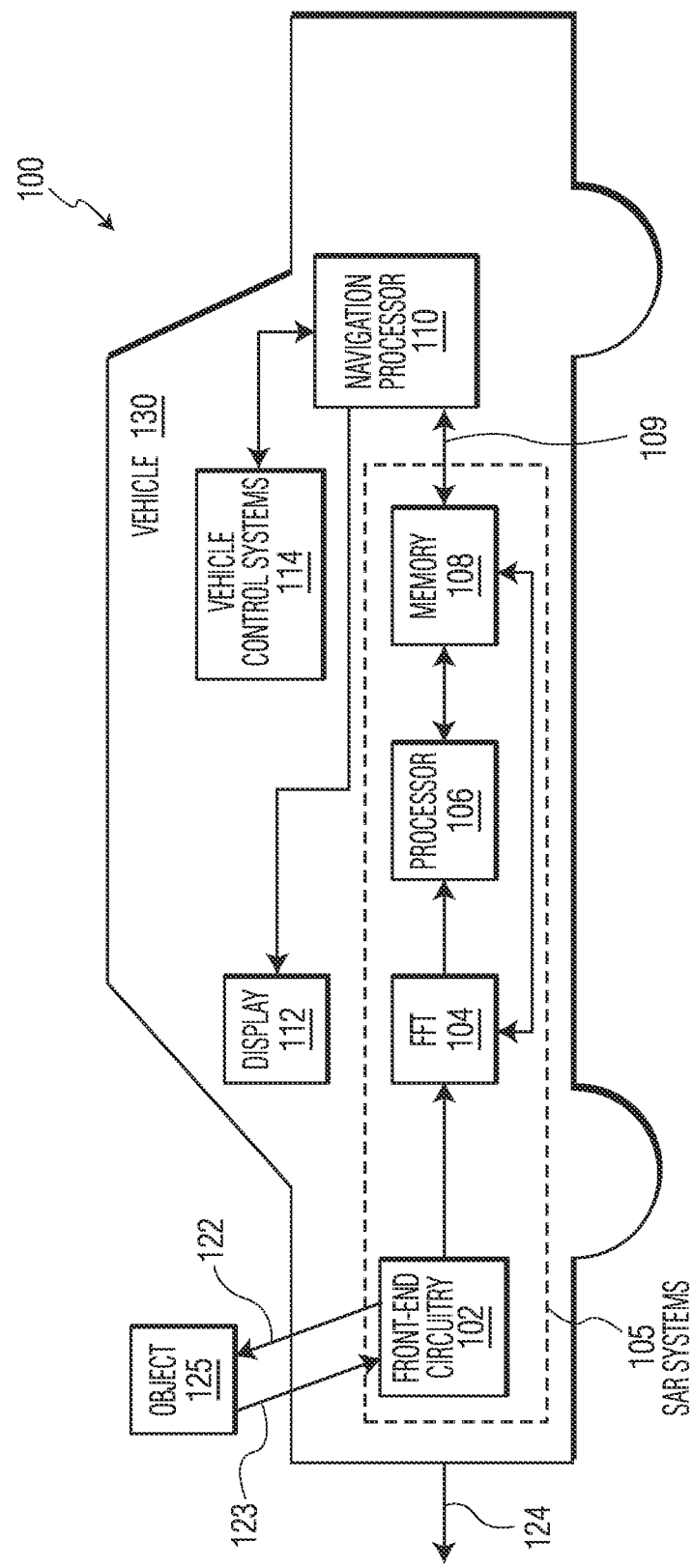
FIG. 1 is a block diagram of an example embodiment for a vehicle including a synthetic aperture radar (SAR) system that implements one or more of the techniques described herein.

Systems and methods are disclosed for synthetic aperture radar (SAR). Within the SAR system, FFT circuits receive digital radar data and output FFT data corresponding to oversampled pixel range values, and the FFT circuits apply FFT processes without zero-padding. Further, the FFT circuits can interpolate the FFT data based upon pixel ranges using a streamlined range computation process. This process pre-computes x-axis components for pixels in common rows and y-axis components for pixels in common columns within the FFT data. A variety of embodiments can be implemented and different features and variations can be implemented while still taking advantage of the techniques described herein.

As described above, the formation of SAR images typically requires that the relative motion between each antenna and any hypothesized point target, on which a pixel is to be constructed, to be precisely known. From this hypothesized range and range rate information, radar data across multiple frames is combined. If a target is indeed present at a hypothesized pixel position and has motion that matches the assumed motion, the energy of the echoes or returns radar signals for this target will add up coherently. On the other hand, if a target is not present at the pixel under test or has motion that does not match the assumed motion, only noise is added up in a non-coherent fashion. As such, over a number (X) of integrations, the signal-to-noise power ratio (SNR) will be enhanced by up to a factor of X, and an image is formed for the target that is indeed present. However, adequate resolution with FFT computations is achieved in prior solutions by zero-padding the original samples by four-times or eight-times or more. Unfortunately, these prior SAR solutions are computationally intensive and impractical for low-cost automotive radar applications.

The disclosed embodiments implement SAR processing in an efficient manner making SAR solutions viable for a wider range of applications including low-cost solutions. The disclosed embodiments in part leverage algorithmic enhancements as well as efficient system-on-chip (SoC) hardware accelerators to make SAR processing practical for a wider range of applications and open a new class of applications for automotive systems based on SAR imaging. For example, SAR techniques can now efficiently be applied to detailed environment mapping, parking assist, parking and autopilot, target classifications, advanced driver assistance system (ADAS) and autonomous driving (AD) functions, or other functions or applications that can take advantage of the SAR systems described herein.

As described further below, the disclosed embodiments significantly reduce the processing load of conventional back projection (BP) SAR processing and improve the quality of formed images. In one aspect of the disclosed embodiments, a high-performance and high-efficiency interpolation approach replaces the conventional zero-padding FFT interpolators as well as interpolators such as linear interpolators, periodic Sinc interpolators, and the DFT interpolators. The improved interpolator techniques described herein can also be implemented using existing ASIC FFT accelerators without enlarging the maximum vector size requirement. In another aspect of the disclosed embodiments, the computation of hypothesized ranges to the pixels under test is streamlined to achieve a much higher computational efficiency without any degradation in the performance. This streamlined range computation can also be implemented with parallel computing hardware cores to achieve high frame throughput. For example, parallel computing can be implemented using vector processors, single-instruction multiple data (SIMD) processors, multiple-instruction multiple data (MIMD) processors, general-purpose graphic processing units (GPGPUs), multi-core central processing units (CPUs), or other hardware processors or combinations of processors. The disclosed embodiments achieve SAR processing with improved performance and higher efficiency as compared to prior solutions. As such, the disclosed embodiments are useful in a wide range of applications and make SAR processing viable for low-cost automotive radar systems and applications.

FIG. 1 is a block diagram of an example embodiment 100 for a vehicle 130 including a SAR system 105 that implements one or more of the techniques described herein. For the example embodiment 100, the vehicle 130 is assumed to be moving in a one direction, as represented by arrow 124, and the imaging provided by the SAR system 105 is directed to one side of the vehicle 130. Multiple SAR systems 105 can also be included on the vehicle 120 to provide imaging for multiple different sides of the vehicle 130. The SAR system 105 includes front-end circuitry 102 that transmits radar signals 122, such as chirps, and captures return radar signals 123 that are reflected by an object 125. The front-end circuitry 102 preferably includes multiple antennas that transmit chirps and receive return signals as the vehicle 130 moves, and these antennas can be dedicated exclusively to transmit operations or receive operations in some solutions. The front-end circuitry 102 also includes mixing and analog-to-digital converter (ADC) circuitry to convert the return radar signals 123 into digital radar data that is sent to FFT circuits 104. These FFT circuits 104 can be, for example, ASICs that are programmed to implement the FFT interpolator functions described herein. The interpolated FFT data output by the FFT circuits 104 is received by the processor 106, and the processor 106 further processes the FFT output data to generate a radar pixel image 109 that is output by the SAR system 105. The memory 108 stores data for the FFT circuits 104 and the processor 106 including the final radar pixel image 109. For one embodiment, the radar pixel image 109 is output by the SAR system 105 to a navigation processor 110, which in turn outputs control signals for autonomous driving of the vehicle 130. For example, the navigation processor 110 can output these control signals to vehicle control systems 114, such as a steering system, an acceleration system, a braking system, or other control system or combination of control systems. For one embodiment, the navigation processor 110 outputs vision-based assistance images to a passenger or driver of the vehicle 130 through a display 112.

It is noted that one or more components of the SAR system 105 including the FFT circuits 104 and the processor 106 can be implemented using one or more application specific integrated circuits (ASICs), microcontrollers, microprocessors, programmable logic devices, or other programmable circuits that execute hardware instructions or program instructions stored in one or more non-volatile data storage mediums to carry out the functions described herein.

In addition, the SAR system 105 can be implemented in whole or in part as a system-on-chip (SoC) integrated circuit. Further, the memory 108 and other memories used by the SAR system 105 can be implemented as one or more data storage mediums configured to store the data described herein. Other variations can also be implemented while still taking advantage of the adaptive sub-tile techniques described herein.

Figure 2:
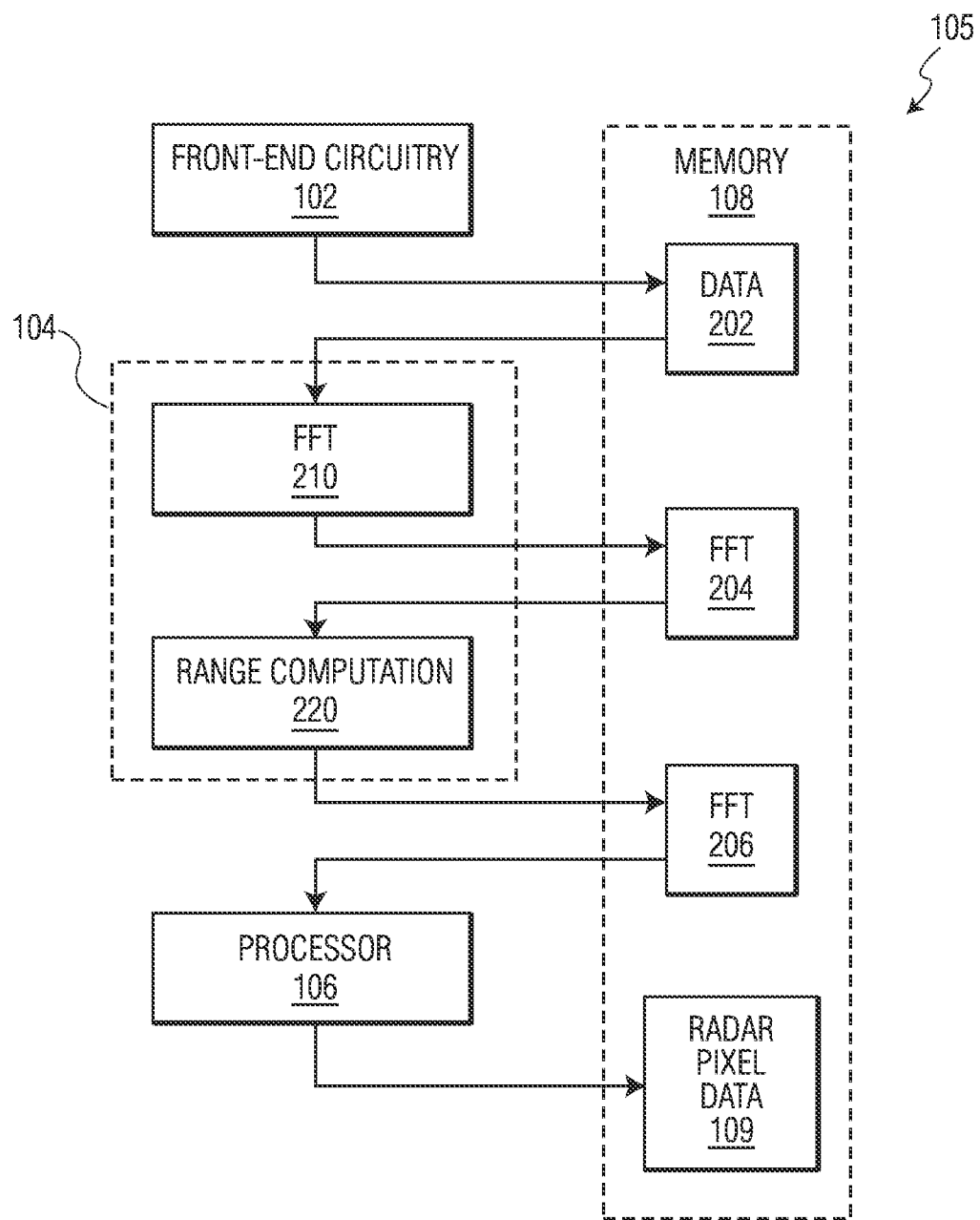
FIG. 2 provides an example embodiment for the SAR system and processing implemented by the SAR system.

FIG. 2 provides an example embodiment for the SAR system 105 and processing implemented using the FFT circuits 104, the processor 106, and the memory 108. As described above, the front-end circuitry 102 sends digital radar data 202 to FFT circuits 104. As shown in more details in FIG. 2, this digital radar data 202 can be stored within memory 108. For one embodiment, the digital radar data 202 is ADC cube data that represents multiple time samples of data collected over time for multiple antennas within the front-end circuitry 102. For example, the ADC cube data can represent a three-dimensional matrix of multiple chirps by multiple antennas by multiple samples over time. The FFT circuits 104 process the digital radar data 202 and generates FFT data 204, which can also be stored in memory 108. As described further below, the FFT circuits 104 implement FFT processes 210 that provide improved efficiency and performance. For one embodiment, the FFT data 204 is range cube data that represents oversampled range cells of FFT data representing pixels for a radar image. For example, the range cube data can represent a three-dimensional matrix of oversampled range cells of FFT data by multiple chirps by multiple antennas. The FFT circuits 104 also processes the FFT data 204 to generate interpolated FFT data 206. As described further below, the FFT circuits 104 can implement a streamlined range computation process 220 to facilitate pixel range determinations. For one embodiment, the interpolated FFT data 206 represents interpolated range cell data that represents an interpolation of multiple data elements from the FFT data 204 to form each cell of the range cell data. The processor 106 then processes the interpolated FFT data 206 to apply phase compensation and coherent integration and to generate the radar pixel image 109, which can also be stored in memory 108. The radar pixel data 109 is output for further use or processing, for example, by a navigation processor 110 as described above. The radar pixel data 109 represents a radar image captured by the SAR system 105. It is noted that memory 108 can be implemented as a single memory or as multiple different memories or registers that store the data being processed and generated by the SAR system 105. Other variations can also be implemented.

In operation, the SAR system 105 implements efficient radar image processing as described further below with respect to FIGS. 3-4. For example, as described with respect to FIG. 3, the SAR system 105 can implement a high-performance and high-efficiency FFT computation and interpolation processes that replaces conventional FFT interpolators. As described with respect to FIG. 4, the SAR system 105 can implement a streamlined range computation for image pixels. Other SAR processing can also be implemented while still taking advantage of the techniques described herein.

Figure 3:
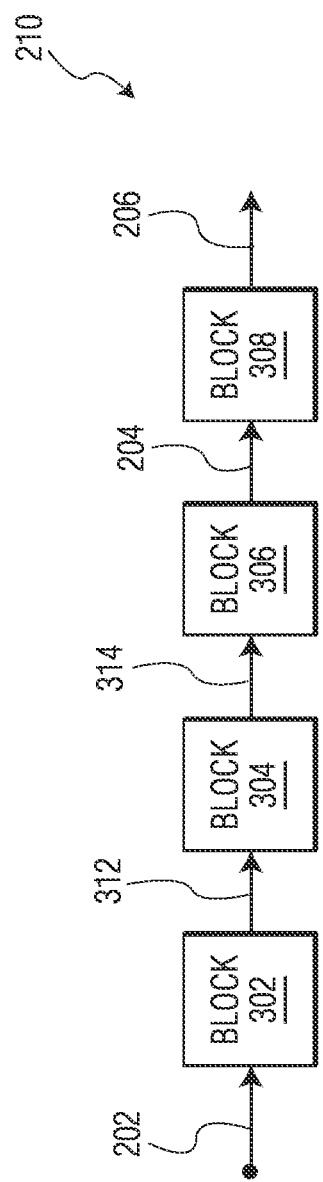
FIG. 3 provides an example embodiment for the high-performance and high-efficiency oversampled FFT processes performed by FFT circuits without using zero-padding.

Looking now to FIG. 3, an example embodiment is provided for the high-performance and high-efficiency oversampled FFT processes 210 performed by FFT circuits 104. In block 302, weights are applied to the signal samples from the ADC cube data 202 to generate weighted samples 312. In block, 304, a modulation application is applied to the weighted samples 312 to generate modulated samples 314. In block 306, a length-N FFT computation is applied to the modulated samples 314 to generate oversampled FFT data 204. As described further below, the length-N FFT computation does not use zero-padding and thereby reduces size and computation requirements. In block 308, the oversampled FFT data 204 is interpolated to generate interpolated FFT data 206, which is output to the processor 106 for further processing as described above.

In operation, the example embodiment of FIG. 3 provides an efficient implementation of an oversampled FFT nearest-cell interpolator. In practice, the sufficiently (e.g., ×4, ×8) oversampled FFT implementation results in negligible quantization error, and the performance is comparable to that of the ideal DFT interpolator or a full-sample periodic Sinc interpolator. In contrast with conventional oversampling FFT solutions that require zero-padding such that the length of FFT is prolonged, the embodiment of FIG. 3 provides an alternative implementation that does not use zero-padding for the length-N FFT computation in block 306.

The alternative SAR processing and efficient FFT interpolators described herein are based on the following formulations. For the case of weighted oversampled FFT of $\{x_n\}$ that evaluates the following DFT expression:

$$Y_k = \sum_{n=0}^{N-1} w_n x_n e^{-j\gamma k n}$$

where $Y_k$ represents the FFT interpolated data; $n = 0, 1, \ldots, N-1$; $k = 0, 1, \ldots, K-1$; $\gamma = 2\pi/K$; $w_n$ represents a weight value; and $x_n$ represents a sample value.

When K/N is an integer, the above equation can be evaluated by computing K/N instances of an N-point FFT operation and by combining their outputs thereby reducing the complexity from O(K log K) to O(K log N) and reducing the required FFT length from K to N. Further, denoting $$\eta = rem\left(k, \frac{K}{N}\right)$$

where $\eta = 0, 1, \ldots, K/N-1$, for a given k and $\eta$:

$$Y_k|_{rem(k,\frac{K}{N})=\eta} = \sum_{n=0}^{N-1} w_n x_n e^{-j\frac{2\pi}{N}\frac{k}{(\frac{K}{N})}n} = \sum_{n=0}^{N-1} (w_n e^{-j\gamma\eta n}) x_n e^{-j\frac{2\pi(k-\eta)}{K}n}$$

where $e^{-j\gamma\eta n}$ is the modulation term; $Y_k$ represents the FFT interpolated data; $\eta$ represents the remainder of k divided by K/N; $n = 0, 1, \ldots, N-1$; $k = 0, 1, \ldots, K-1$; $\gamma = 2\pi/K$; $w_n$ represents a weight value; $x_n$ represents a sample value; and K, N, and K/N are integers with K>N. In general, K/N instances are needed for FFT computations for all K output samples of $Y_k$. For an example of K/N=4 (such that $\eta = 0, 1, 2, 3$), the 4 instances of the N-point DFT are:

$$Y_k = \sum_{n=0}^{N-1} w_n x_n e^{-j\frac{2\pi}{N}\frac{k}{4}n} = \begin{cases} \sum_{n=0}^{N-1} w_n x_n e^{-j\frac{2\pi}{N}\frac{k}{4}n} & \text{for } rem\left(k, \frac{K}{N}\right) = 0 \\ \sum_{n=0}^{N-1} \left(w_n e^{-j\frac{2\pi}{4N}n}\right) x_n e^{-j\frac{2\pi}{N}\frac{k-1}{4}n} & \text{for } rem\left(k, \frac{K}{N}\right) = 1 \\ \sum_{n=0}^{N-1} \left(w_n e^{-j\frac{4\pi}{4N}n}\right) x_n e^{-j\frac{2\pi}{N}\frac{k-2}{4}n} & \text{for } rem\left(k, \frac{K}{N}\right) = 2 \\ \sum_{n=0}^{N-1} \left(w_n e^{-j\frac{6\pi}{4N}n}\right) x_n e^{-j\frac{2\pi}{N}\frac{k-3}{4}n} & \text{for } rem\left(k, \frac{K}{N}\right) = 3 \end{cases}$$

where each instance is evaluated using an N-point FFT. Further, it is noted that $$rem\left(k, \frac{K}{N}\right)$$

represents the remainder (rem) of k divided by K/N.

The above formulas show the output (Y) of the process can be implemented using multiple shorter (i.e., fewer number of samples) DFT operations. More specifically, looking at the N elements of the output Y: Y[1], Y[2], . . . Y[K], the elements with indices k such that rem(k,K/N)=0 will form a group. The indices k such that rem(k,K/N)=1 will form another group, and so on. This continues to form a total K/N groups. Each of these K/N groups is computed using the DFT formula with the N-sample (x) as an input. Although the formula above is written using a DFT expression, it is recognized that FFT is simply a faster implementation of DFT, and it is understood that this DFT expression can be implemented using FFT operations. As such, the above process leads to K/N instances of N-sample FFT operations.

Looking back to FIGS. 2-3, the processing of the FFT processes 210 provide efficient oversampled FFT operation for a SAR system 105. Given N input samples within data 202, the complex weighting provided in block 302 can have a complexity of O{N}. The K/N-times oversampled FFT operation (K/N instances of length-N FFT) in block 306 has a complexity of O{K+K log N}. The subsequent nearest-cell interpolation and quantization in block 308 has a complexity of O{M}. The computing of the normalized range value ($\omega_m$) for each pixel has a complexity of O{4} or O{4M} for M pixels. The normalized range value ($\omega_m$) of the m-th pixel can be calculated as:

$$\omega_m = k_{m\_to\_Hz}\sqrt{(x_{pixel}-x_{radar})^2 + (y_{pixel}-y_{radar})^2}$$

where $k_{m\_to\_Hz}$ is a scaling constant converting meters to Hz according to the chirp de-ramp mixing effect; [$x_{pixel}, y_{pixel}$] are the pixel's x and y positions relative to a global frame of reference; and [$x_{radar}, y_{radar}$] are the antenna's x and y positions relative to a global frame of reference. For the above equation, it is assumed that the transmit and receive antennas are co-located, and this expression can be extended to cases where the transmit and receive antennas are not co-located.

Finally, phase compensation can have a complexity of O{M}. As a result, the total complexity amounts to O{N+K+K log N+5M}. It can be seen that if K(1+log N)<NM the efficient oversampled FFT approach described herein is more efficient than a traditional DFT-based approach. It can also be seen if K log N+K<K log K+M, the efficient oversampled FFT approach described herein is more efficient than a conventional oversampled FFT SAR approach where K samples are used. Because K is multiple times larger than N by definition and where M (e.g., number of pixel, a 200×200 image results in M=40,000) is usually much larger than K, the efficient oversampled FFT approach described herein is almost always more efficient.

In addition to the algorithmic improvement of the oversampled FFT processing provided by the FFT circuits 104, the FFT circuits 104 can be carried out in one or more ASIC-based N-point FFT accelerators. In contrast to the N-point FFT solution in FIG. 3, conventional implementation requires a K-point FFT that is many times larger than the N-point FFT technique describe herein. The relaxed requirement on FFT size makes the disclosed embodiments practical for a wide range of solutions.

In addition to FFT computations, one main contributor to the computational complexity of prior SAR solutions is the calculation of pixel ranges. For example, when the number of pixels increases in a SAR solution, the pixel range calculations become a dominant factor increasing complexity in the computational requirements. In addition to reducing the complexity through the efficient oversampled FFT processes described in FIG. 3, complexity of the pixel range calculations can also be reduced using the technique described below.

Figure 4:
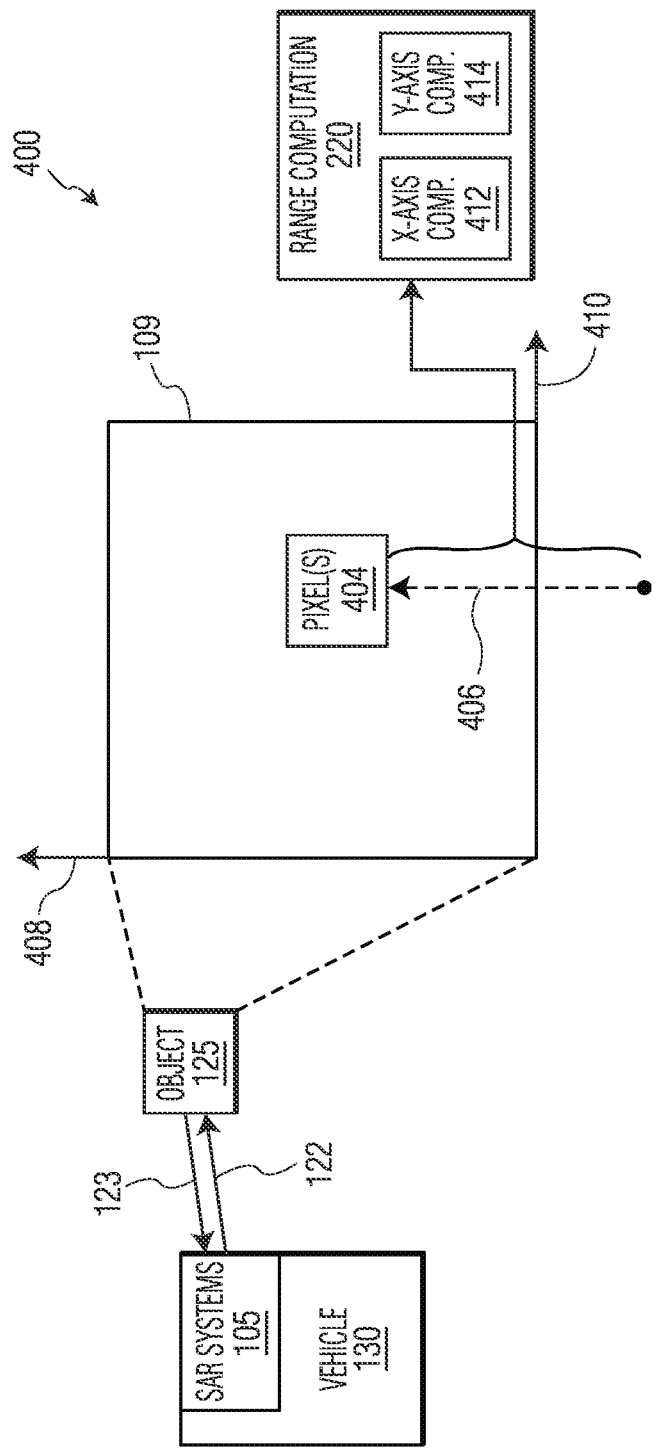
FIG. 4 provides an example embodiment where a streamlined range computation process is used to determine a range for each pixel within the radar pixel image being generated.

Looking now to FIG. 4, an example embodiment 400 is provided where streamlined range computation process 220 is used to determine a range 406 for each pixel 404 within the radar pixel image 109 being generated. The radar pixel image 109 is shown with respect to an x-axis 408 and a y-axis 410. The vehicle 130, which is moving, encounters an object 125 within a scene being detected by the SAR system 105. As described above, radar signals 122, such as chirps, are transmitted by the SAR system 105, and return radar signals 123 reflected by an object 125 are received by the SAR system 105. The SAR system 105 processes the return radar signals 123 to generate a radar pixel image 109 representing the scene being detected including object 125. The radar pixel image 109 includes an array of pixels 404, and a range 406 is determined for each pixel 404. The range 406 represents the hypothetical range from the vehicle 130 to a portion of reflecting object 125 represented by pixel 404. The range 406 for each pixel is determined using the range computation process 220. As described below, the range computation process 220 uses pre-computed x-axis components 412, pre-computed y-axis components 414, or both to achieve reduced computational complexity in determining the range for each pixel 404. These pre-computed x-axis and y-axis components 412/414 can be stored, for example, in the memory 108 or in another memory used by the SAR system 105.

Initially, upon the examination of the following simplistic range equation, it can be concluded that the complexity of the standard computation is O{$3M_xM_y$} for an SAR image consisting of $M_x$ horizontal positions and $M_y$ vertical positions.

$$\text{pixel range} = \sqrt{(x_{m_x}-X)^2 + (y_{m_y}-Y)^2}; (m_x=0:M_x-1, y_x=0:M_y-1)$$

Looking again to FIG. 4, a geometric relationship exists between the pixel image 109 and the radar antennas within the SAR system 105. As an example, if the pixel image 109 is $M_x$ pixels by $M_y$ pixels and if $M_x$=200 and $M_y$=200, then the conventional range computation results in complexity of O{$3M_xM_y$}=120,000.

Upon a closer examination, it is noted for the disclosed embodiments that, if the imaged area is arranged in a rectangular grid fashion, the y-axis components (i.e., $(y_{m_y}-Y)^2$) in the square root of the range equation of a row are identical for all pixels on the same row. Likewise, the x-axis components (i.e., $(x_{m_x}-X)^2$) in the square root of the range equation of a column are identical for all pixels on the same column. As a result, savings can be achieved by pre-calculating the x-axis components and storing them as x-axis components 412, pre-calculating the y-axis components and storing them as y-axis components 414, or both. The x-axis components 412 can be pre-calculated by computing the values for: $(x_{m_x}-X)^2$ for each x value from $m_x=0$ to $M_x-1$. The y-axis components 414 can be pre-calculated by computing the values for: $(y_{m_y}-Y)^2$ for each y value from $m_y=0$ to $M_y-1$. These pre-calculated x-axis and y-axis components 412/414 can then be re-used in pixel range calculations for pixels within the same column or the same row thereby reducing computational complexity. As a result, the complexity is reduced to $O\{M_x M_y+(M_x+M_y)\}$ for all pixels. Comparing to the prior example of $M_x=200$ and $M_y=200$, the complexity is reduced to 40400 from the original 120000. The saving becomes more and more significant with increasing values of $M_x$ and $M_y$.

In addition to the algorithmic enhancement of the pixel range determinations, the implementation of FIG. 4 can be further enhanced by applying parallel computing hardware resources. For example, the range computations can be parallelized by sending multiple $x_{m_x}$ values of a row to multiple hardware cores or components, such as ALUs (Arithmetic Logic Units) of a computing core, and loading each ALU with constant values of $-X$ and $(y_{m_y}-Y)^2$. Sequential instructions can then be performed that first perform an addition operation to compute "$x_{m_x}-X$", then perform a square operation to compute "$(x_{m_x}-X)^2$", then perform another addition operation to compute "$(x_{m_x}-X)^2+(y_{m_y}-Y)^2$", and finally perform a square root operation to compute the pixel range value "$\sqrt{(x_{m_x}-X)^2+(y_{m_y}-Y)^2}$".

It is noted that the radar position for the SAR system 105 is assumed to be changing at each chirp start due to the movement of the vehicle 130. As such, the pixel range computation is performed for each chirp. Because the processing is performed on a chirp-by-chirp basis, the movement of SAR system 105 does not need to be constant for the SAR processing to work. The radar position information is assumed to be estimated by a position sensor, such as a GPS-IMU sensor, and this position information is provided to the SAR system 105. Because the instruction and loaded constant values are identical to each of the multiple $x_{m_x}$ values fed to the vector of the ALUs, multiple pixel ranges can be computed within the same number of cycles that is required to compute a single pixel in a sequential fashion. For example, by utilizing a SIMD (single instruction multiple data) processor or vector processor, the computation throughput can be greatly increased. Likewise, the parallelization can also be carried out by other kinds of parallel computing resources such as a MIMD (multiple instruction multiple data) processor, a general-purpose graphic processing unit (GP-GPU), a multiple-core CPU, or other hardware cores.

It is further noted that combining the pixel range determination processes of FIG. 4 with the oversampled FFT processes of FIG. 3 provides further efficiency advantages and reduction in complexity. With the efficient oversampling FFT of FIG. 3, the order of complexity is reduced to $O\{N+K+K \log_2 (N)+5M\}$ not including the reduction in the pixel range computation. By replacing the conventional pixel range computation approach with the optimized pixel range computation of FIG. 3, the complexity is further reduced to $O\{N+K+K \log_2 (N)+(M_x+M_y)+3M\}$. As such, the combination provides a high efficiency and high performance solution for a SAR system that is practical for a wide range of applications including automotive radar systems and applications. Further, as described above, the SAR images can be displayed to a driver or can be sent to further automotive processing units to support autonomous self-driving functions or other advanced driver assistance functions.

As described herein, a variety of embodiments can be implemented and different features and variations can be implemented, as desired.

For one embodiment, a radar system is disclosed including front-end circuitry, FFT circuits, and a processor. The front-end circuitry is coupled to transmit radar signals, to receive return radar signals, and to output digital radar data. The FFT circuits coupled to receive the digital radar data and to output FFT data corresponding to oversampled pixel range values, and the FFT circuits are configured to apply FFT processes without zero-padding. A processor coupled to receive the FFT data and to output radar pixel data representing a radar image.

In additional embodiments, the radar system also includes a navigation processor coupled to receive the radar pixel data and to cause one or more actions to occur based upon the radar pixel data; and the front-end circuitry, the FFT circuits, the processor, and the navigation processor are coupled within a vehicle. In further embodiments, the one or more actions include at least one of an advanced driver assistance system function or an autonomous driving function.

In additional embodiments, the FFT circuits are configured to output interpolated FFT data based upon pixel ranges. In further embodiments, the FFT circuits are configured to perform K/N instances of N-sample FFT operations to generate the interpolated FFT data where K, N, and K/N are integers and K>N. In further embodiments, the FFT data represents x-axis data and y-axis data for pixels within the radar image, and the FFT circuits are configured to pre-compute x-axis components for pixels in common rows and y-axis components for pixels in common columns. In still further embodiments, the FFT circuits include a plurality of hardware cores configured to process the FFT data in parallel to output the interpolated FFT data.

In additional embodiments, the front-end circuitry includes antennas configured to transmit radar chirp signals and to receive return radar signals and digital-to-analog converter circuitry configured to convert the return radar signals to the digital radar data.

For one embodiment, a circuit assembly is disclosed including FFT circuits and a processor. The FFT circuits are coupled to receive the digital radar data and to output FFT data corresponding to oversampled pixel range values, the FFT circuits being configured to apply FFT processes without zero-padding. The processor is coupled to receive the FFT data and to output radar pixel data representing a radar image.

In additional embodiments, the FFT circuits include a plurality of application specific integrated circuits. In further additional embodiments, the FFT circuits are configured to output interpolated FFT data based upon pixel ranges. In further embodiments, the FFT circuits are configured to perform K/N instances of N-sample FFT operations to generate the interpolated FFT data where K, N, and K/N are integers and K>N. In further embodiments, the FFT data represents x-axis data and y-axis data for pixels within the radar image, and the FFT circuits are configured to precompute x-axis components for pixels in common rows and y-axis components for pixels in common columns.

For one embodiment, a method to generate a radar image is disclosed including transmitting radar signals, receiving return radar signals, converting the return radar signals to digital radar data, processing the digital radar data with FFT circuits by applying FFT processes without zero-padding to output FFT data corresponding to oversampled pixel range values, and outputting radar pixel data representing a radar image based upon the FFT data.

In additional embodiments, the method includes performing the transmitting, receiving, converting, processing, and outputting within a vehicle, and further includes causing one or more actions to occur based upon the radar pixel data. In further embodiments, the one or more actions includes at least one of an advanced driver assistance system function or an autonomous driving function.

In additional embodiments, the method includes interpolating the FFT data based upon pixel ranges to generate interpolated FFT data prior to the outputting. In further embodiments, the processing performs K/N instances of N-sample FFT operations to generate the interpolated FFT data where K, N, and K/N are integers and K>N. In further embodiments, the FFT data represents x-axis data and y-axis data for pixels within the radar image, and the method includes pre-computing x-axis components for pixels in common rows and y-axis components for pixels in common columns for the interpolating. In still further embodiments, the method includes performing the interpolating in parallel with a plurality of hardware cores.

It is further noted that the functional blocks, components, systems, devices, or circuitry described herein can be implemented using hardware, software, or a combination of hardware and software along with analog circuitry as needed. For example, the disclosed embodiments can be implemented using one or more integrated circuits that are programmed to perform the functions, tasks, methods, actions, or other operational features described herein for the disclosed embodiments. The one or more integrated circuits can include, for example, one or more processors or configurable logic devices (CLDs) or a combination thereof. The one or more processors can be, for example, one or more central processing units (CPUs), control circuits, microcontroller, microprocessors, hardware accelerators, ASIC s (application specific integrated circuit), or other integrated processing devices. The one or more CLDs can be, for example, one or more CPLDs (complex programmable logic devices), FPGAs (field programmable gate arrays), PLAs (programmable logic array), reconfigurable logic circuits, or other integrated logic devices. Further, the integrated circuits, including the one or more processors, can be programmed to execute software, firmware, code, or other program instructions that are embodied in one or more non-transitory tangible computer-readable mediums to perform the functions, tasks, methods, actions, or other operational features described herein for the disclosed embodiments. The integrated circuits, including the one or more CLDs, can also be programmed using logic code, logic definitions, hardware description languages, configuration files, or other logic instructions that are embodied in one or more non-transitory tangible computer-readable mediums to perform the functions, tasks, methods, actions, or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, or any other non-transitory tangible computer-readable mediums. Other variations can also be implemented while still taking advantage of the techniques described herein.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A radar system, comprising:
    front-end circuitry coupled to transmit radar signals, configured to receive return radar signals, and configured to output digital radar data;
    FFT circuits coupled to receive the digital radar data and configured to output FFT data corresponding to oversampled pixel range values, the FFT circuits being configured to apply FFT processes without zero-padding wherein the FFT circuits are configured to output K interpolated FFT data points based upon pixel ranges and perform K/N instances of N-sample FFT operations to generate the interpolated FFT data, wherein the interpolated FFT data have a K/N times smaller range resolution, and wherein K, N, and K/N are integers and K>N; and
    a processor coupled to receive the FFT data and configured to output radar pixel data representing a radar image.

2. The radar system of claim 1, further comprising a navigation processor coupled to receive the radar pixel data and to cause one navigation action to occur based upon the radar pixel data;
    and wherein the front-end circuitry, the FFT circuits, the processor, and the navigation processor are coupled within a vehicle.

3. The radar system of claim 2, wherein the one navigation action comprises at least one of an advanced driver assistance system function or an autonomous driving function.

4. The radar system of claim 1, wherein the FFT data represents x-axis data and y-axis data for pixels within the radar image, and wherein the FFT circuits are configured to pre-compute x-axis components for pixels in common rows and y-axis components for pixels in common columns.

5. The radar system of claim 4, wherein the FFT circuits comprise a plurality of hardware cores configured to process the FFT data in parallel to output the interpolated FFT data.

6. The radar system of claim 1, wherein the front-end circuitry comprises antennas configured to transmit radar chirp signals and to receive return radar signals and digital-to-analog converter circuitry configured to convert the return radar signals to the digital radar data.

7. A circuit assembly, comprising
FFT circuits coupled to receive the digital radar data and configured to output FFT data corresponding to oversampled pixel range values, the FFT circuits being configured to apply FFT processes without zero-padding wherein the FFT circuits are configured to output K interpolated FFT data points based upon pixel ranges and perform K/N instances of N-sample FFT operations to generate the interpolated FFT data, wherein the interpolated FFT data have a K/N times smaller range resolution, and wherein K, N, and K/N are integers and K>N; and
a processor coupled to receive the FFT data and configured to output radar pixel data representing a radar image.

8. The circuit assembly of claim 7, wherein the FFT circuits comprise a plurality of application specific integrated circuits.

9. The circuit assembly of claim 7, wherein the FFT data represents x-axis data and y-axis data for pixels within the radar image, and wherein the FFT circuits are configured to pre-compute x-axis components for pixels in common rows and y-axis components for pixels in common columns.

10. A method to generate a radar image, comprising:
transmitting radar signals;
receiving return radar signals;
converting the return radar signals to digital radar data;
processing, with FFT circuits, the digital radar data by applying FFT processes without zero-padding to output FFT data corresponding to oversampled pixel range values wherein processing the digital radar data by applying FFT processes includes interpolating the FFT data based upon pixel ranges to generate interpolated FFT data prior to the outputting and performing K/N instances of N-sample FFT operations to generate the interpolated FFT data, wherein the interpolated FFT data have a K/N times smaller range resolution, and wherein K, N, and K/N are integers and K>N; and
outputting radar pixel data representing a radar image based upon the FFT data.

11. The method of claim 10, further comprising performing the transmitting, receiving, converting, processing, and outputting within a vehicle, and further comprising causing one navigation action to occur based upon the radar pixel data.

12. The method of claim 11, wherein the one navigation action comprises at least one of an advanced driver assistance system function or an autonomous driving function.

13. The method of claim 10, wherein the FFT data represents x-axis data and y-axis data for pixels within the radar image, and further comprising pre-computing x-axis components for pixels in common rows and y-axis components for pixels in common columns for the interpolating.

14. The method of claim 13, further comprising performing the interpolating in parallel with a plurality of hardware cores.

* * * * *